US010547980B1

(12) United States Patent
Ayotte et al.

(10) Patent No.: US 10,547,980 B1
(45) Date of Patent: Jan. 28, 2020

(54) DEVICE MOVEMENT CORRELATIONS

(71) Applicant: Hewlett Packard Enterprise Development LP, Houston, TX (US)

(72) Inventors: Eddie Ayotte, Laval (CA); Kiran Ashokan, Santa Clara, CA (US); Dominik Seelos, St. Laurent (CA); Florent Granier, St. Laurent (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/171,946

(22) Filed: Oct. 26, 2018

(51) Int. Cl.
*H04W 4/029* (2018.01)
*H04W 4/021* (2018.01)
*H04L 29/08* (2006.01)
*H04L 29/12* (2006.01)

(52) U.S. Cl.
CPC .......... *H04W 4/029* (2018.02); *H04L 67/306* (2013.01); *H04W 4/021* (2013.01); *H04L 61/6022* (2013.01)

(58) Field of Classification Search
CPC ... H04W 4/029; H04L 67/306; H04L 61/6022
USPC ............... 455/456.1, 410, 418, 414.1, 432.1
See application file for complete search history.

(56) References Cited

U.S. PATENT DOCUMENTS

| | | | |
|---|---|---|---|
| 9,438,865 B2 | 9/2016 | Renkis | |
| 9,659,474 B1 | 5/2017 | Kashyap et al. | |
| 9,785,829 B2 | 10/2017 | Kano et al. | |
| 9,813,850 B2 | 11/2017 | Lee et al. | |
| 2009/0268030 A1 | 10/2009 | Markham | |
| 2010/0202455 A1* | 8/2010 | Sundaram | H04W 8/082 370/392 |
| 2015/0126222 A1* | 5/2015 | Ignatin | G01O 21/26 455/456.3 |
| 2018/0077538 A1* | 3/2018 | Matus | B60R 21/0132 |

OTHER PUBLICATIONS

6 Ways to use BLE beacons for people and asset tracking, (Research Paper), Jul. 12, 2017, 17 Pgs.
Al-Karkhi, A. et al., Non-intrusive User Identity Provisioning in the Internet of Things, (Research Paper), Sep. 21-26, 2016, 8 Pgs.

* cited by examiner

*Primary Examiner* — Nghi H Ly
(74) *Attorney, Agent, or Firm* — Brooks, Cameron & Huebsch, PLLC

(57) ABSTRACT

An example of a system may include a computing device, communicatively coupled to a network device, including: a processing resource; and a memory resource. The memory resource may store instructions executable by the processing resource to: track a movement of a first mobile device through a physical environment based on a first wireless signal received, at the network device, from the first mobile device; track a movement of a second mobile device through the physical environment based on a second wireless signal received, at the network device, from the second mobile device; associate the first mobile device with the movement of the second mobile device based on a correlation between the tracked movement of the first mobile device and the tracked movement of the second mobile device; and assign, based on the association, an action to be executed upon a next detection of the first mobile device by the network device.

16 Claims, 5 Drawing Sheets

DEVICE MOVEMENT CORRELATIONS

BACKGROUND

Computing networks and network devices providing access to these computing networks are ubiquitous in our homes, offices, and other environments. Such computing networks may be utilized to communicate with mobile devices moving through the environment where network access is provided.

DETAILED DESCRIPTION

Figure 1:
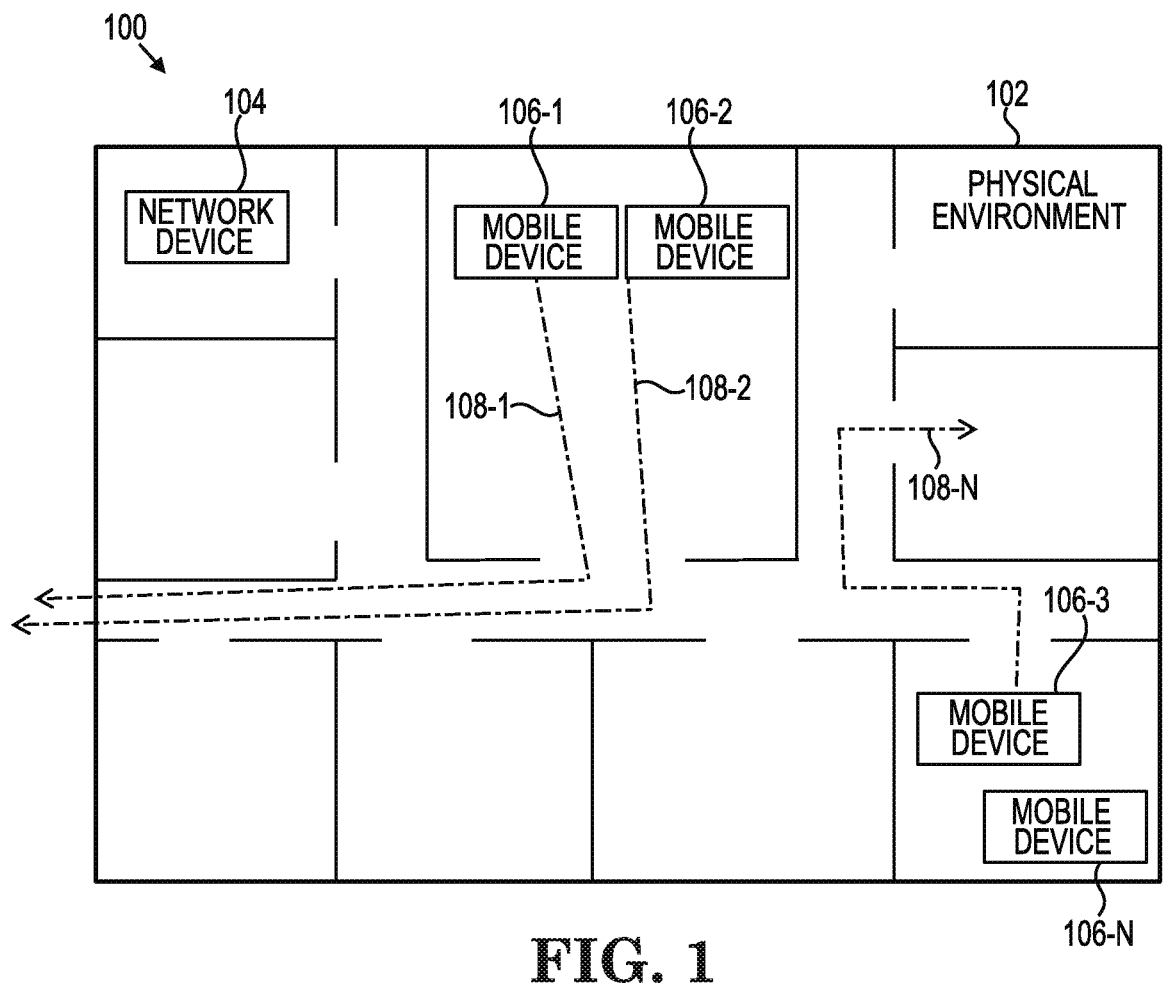
FIG. 1 illustrates an example of an environment for device movement correlations consistent with the disclosure.

Mobile devices may be resident in and/or pass through physical environments where access to a computing network is provided. Mobile devices may include client devices that are adapted to communicate data with a computing network while moving through the physical environment where access to the computing network is provided.

Mobile devices may be wirelessly tracked by network devices, communicatively coupled to the computing network, in the physical environment where access to the computing network is provided as the mobile devices move in the physical environment. In some examples, this tracking may be utilized to monitor the presence of a tracked asset within the physical environment. A tracked asset may include a physical object that is an asset of the physical environment designated for tracking. The tracked asset may be the mobile device, and/or the tracked asset may be an object that is separate from and/or tethered to the mobile device (e.g., an object physically connected to a tracking tag).

Tracking assets may be utilized to keep track of the location of physical objects, locate missing physical objects within the physical environment, as a security measure, as a theft recovery measure, etc. Tracked assets may be high-value objects and/or objects critical to an operation within a physical environment where access to the computing network is provided. As such, tracking of the assets may serve to protect the value and/or execution of the critical operation by maintaining an awareness of the presence of the tracked asset within the physical environment.

Prior asset tracking systems may utilize network devices to monitor the presence of mobile devices communicatively coupled or capable of being communicatively coupled to a computing network and/or is physically located within the physical environment where access to the computing network is provided. However, the prior asset tracking system may rely on the continued presence of the mobile device in the physical environment within a wireless signal range to network devices in order to locate or track the tracked asset. As such, once the mobile device leaves the physical environment where the access to the computing network is provided and/or leaves the wireless signal range of the network devices tracking the mobile device, the physical asset may be lost insofar as the computing network and/or security personnel are concerned. Additionally, in such examples, it may not be known who absconded with or moved the tracked asset.

In contrast, examples of the present disclosure may be utilized to identify other mobile devices that are associated with movement of a tracked asset and assign actions to the mobile device associated with the movement of the tracked asset. As such, the entity that absconded with and/or is responsible for the movement of the tracked asset may be identified leading to an increased likelihood of asset recovery and/or loss prevention. For example, a system consistent with the present disclosure may include a computing device, communicatively coupled to a network device, including a processing resource and a memory resource. The memory resource may store instructions executable by the processing resource to track a movement of a first mobile device through a physical environment based on a first wireless signal received, at the network device, from the first mobile device. The memory resource may store instructions executable by the processing resource to track a movement of a second mobile device through the physical environment based on a second wireless signal received, at the network device, from the second mobile device. The memory resource may store instructions executable by the processing resource to associate the first mobile device with the movement of the second mobile device based on a correlation between the tracked movement of the first mobile device and the tracked movement of the second mobile device. The memory resource may store instructions executable by the processing resource to assign, based on the association, an action to be executed upon a next detection of the first mobile device by the network device. In this manner seemingly-uncorrelated devices or devices with unreported correlations may be associated together based on their behavior in the physical environment. These associations may provide data that improves asset tracking and/or asset recovery by identifying responsible parties.

As used herein, a network device may include a computing device that is communicatively coupled or capable of being communicatively coupled to a computing network. The network device may be adapted to transmit to and/or receive signals from mobile devices and to process information within such signaling. For example, a network device may transmit to and/or receive data from mobile devices utilizing wireless signals. In some examples, a network device may include a device that provides access to a computing network for mobile devices in a physical environment within a physical proximity to the network device. For example, a network device may include a network controller, an access point, a data transfer device, etc. In some examples, the network device may include a scanner device that may scan for, receive signals from, and/or send signals to mobile devices within a physical proximity to the scanner that have operating transceivers and/or transmitters capable of communicating with various scanned-for communication protocols (e.g., IEEE protocols, IEEE 802.15.4 ZigBee, IEEE 802.11 WiFi, IEEE 802.15.1 Bluetooth and BLE, IEEE 802.16 WiMax, LTE, 5G, NFC, RFID, etc.).

As used herein, a mobile device may include a device such as a computing device, a beacon, as security tag, etc. that may include transceivers and/or transmitters capable of communicating signals utilizing communication protocols such as those mentioned above. That is, in some examples, the mobile device may include a wireless communications interface to send and/or receive data to and/or from a computing network utilizing wireless communication signals. In some examples, a mobile device may include a computing device including hardware and/or a combination of hardware and instructions executable by the hardware to access and/or communicate with the network and/or other network devices on the network. In some examples, the client device may include a wireless communications interface to send and/or receive data to and/or from a computing network utilizing wireless communication signals. For example, a client device may include any data processing equipment such as a computer, laptop, cellular phone, smart phone, personal digital assistant, tablet devices, smart devices, wearable smart devices, smart watch, smart glasses, augmented reality devices, virtual reality devices, etc. that may request and/or consume services and/or computing resources provided by a computing network utilizing the aforementioned communication signals.

As used herein, mobile devices may include devices that are portable or may be readily moved throughout a physical environment of a computing network. That is, mobile devices may be moved through a physical environment without disassembly and while still operating and/or communicating.

As used herein, mobile devices may include devices that may attach to other physical objects. For example, a mobile device may include a signal emitting tag affixed to mobile and/or stationary merchandise, valuable assets, assets critical to an operation, expensive objects, computing devices, etc.

As used herein, an Access Point (AP) may include a computing device including hardware and/or a combination of hardware and instructions executable by the hardware to operate as a transmitter and/or a receiver of signals between a mobile device, a client device, other access points, a controller, and/or other network devices on the network. In some examples, an AP may act as a transmitter and/or receiver of wireless radio signals for any known or convenient wireless access technology which may later become known. While the term AP may include network devices that transmit and/or receive IEEE 802.11-based Wi-Fi signals, AP is not intended to be limited to IEEE 802.11-based APs.

APs may generally function as an electronic device that is adapted to allow wireless computing devices, such as client devices, to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces and/or 802.15 interfaces, although examples of the disclosure are not limited to such interfaces. An AP can include a memory resource, including read-write memory, and a hierarchy of persistent memory such as ROM, EPROM, and Flash memory.

As used herein, a data transfer device may include a computing device including hardware and/or a combination of hardware and instructions executable by the hardware to operate as an intermediary device for coordinating the transfer of data between network device across a network and/or to other networks. For example, a data transfer device may include network switches, routers, controllers, etc.

As used herein, a network controller may include a computing device including hardware and/or a combination of hardware and instructions executable by the hardware to manage APs and data transfer among the APs in the network. A controller may include a wireless local area network (WLAN) controller. The WLAN controller may coordinate the operation of and/or communication between APs in the network to: mitigate interference between wireless APs, perform load balancing, provide fail over redundancy, retrieve upgrades, and/or send updates to the APs, etc. In some examples, the APs may connect, via a wired connection and/or wirelessly, to a controller and the controller may connect to a wireless network. In some examples, the controller may be AP-based controllers that are integrated with the AP.

As used herein, a scanner may include a device and/or instructions executable to scan its surrounding physical environment and/or a computing network for signals from surrounding devices. For example, the scanner may scan for and detect the presence of mobile devices such as client devices in the physical environment where access to a computing network is provided. The scanner may include a specific-purpose computing device adapted as a standalone network appliance. Alternatively, a scanner may be integrated into or utilize functionalities of other network devices, such as an AP. A scanner may include a device that may utilize a transceiver and/or receiver to scan for, receive signals from, and/or send signals to mobile devices within a physical proximity to the scanner that have operating transceivers and/or transmitters capable of communicating with various scanned-for communication protocols (e.g., IEEE protocols, IEEE 802.15.4 ZigBee, IEEE 802.11 WiFi, IEEE 802.15.1 Bluetooth and BLE, IEEE 802.16 WiMax, LTE, 5G, NFC, RFID, etc.). A scanner device may collect information from the surrounding devices and/or may determine or provide data to be utilized to determine the physical location of the surrounding devices in the physical environment.

FIG. 1 illustrates an example of an environment 100 for device movement correlations consistent with the disclosure. The environment is not limited to a particular example described herein and may include additional components and/or functionalities such as those described with regard to the system 216 of FIG. 2, the system 322 of FIG. 3, the non-transitory machine-readable medium 430 of FIG. 4, and/or the method 550 of FIG. 5.

The environment 100 may include a physical environment 102. The physical environment 102 is illustrated as a floor plan view of a building physical environment, but examples are not so limited. The physical environment 102 may be a physical environment such as a building where a wireless access to a computing network is being provided.

The environment 100 may include a network device 104. In some examples, the environment 100 may include a plurality of network devices such as network device 104. That is, while only a single network device 104 is visible in FIG. 1, multiple network devices may be utilized and each reference to network device 104 is equally applicable each network device of a plurality of network devices utilized in concert. The network device 104 may be communicatively coupled to a computing network and/or to other network devices. For example, the network device 104 may be communicatively coupled to a local area network and/or network that other network devices are coupled to. For example, the network device 104 may be connected to a local area network providing network coverage access to which is offered in and/or around a physical environment 102 environment where the network device 104 is present such as home, an office building, a vehicle, an outdoor space, etc.

The network device 104 may be an AP. As such, the network device 104 may be connected to a computing network. The network device 104 may provide, to client device in the physical environment within range of the signals provided by the network device 104, access to the computing network to which the network device 104 is connected. For example, the network device 104 may utilize Wi-Fi transceivers, Bluetooth transceivers, Bluetooth Low Energy (BLE) transceivers, ZigBee transceivers, Global System for Mobile Communications (GSM) standard communication transceivers, Code Division Multiple Access (CDMA) standard communication transceivers, etc. to wirelessly communicate data with mobile devices in the physical environment surrounding the network device.

The network device 104 may include a scanner. The scanner may be a standalone network appliance and/or a portion of another device such as an AP. The scanner may scan for wireless signals transmitted by mobile devices in the physical environment where the scanner is located and within a detection range of the scanner.

The network device 104 may perform wireless scanning for wireless signals transmitted by mobile devices 106-1 . . . 106-N in the physical environment 102. The network device 104 may utilize Wi-Fi transceivers, Bluetooth transceivers, Bluetooth Low Energy (BLE) transceivers, ZigBee transceivers, Global System for Mobile Communications (GSM) standard communication transceivers, Code Division Multiple Access (CDMA) standard communication transceivers, etc. to scan for the wireless signals transmitted by the mobile devices 106-1 . . . 106-N in the physical environment 102. The network device 104 may, for example, may detect the presence and/or position of at least one of Bluetooth low energy (BLE) standard, Bluetooth standard, global system for mobile communications (GSM) standard, code-division multiple access (CDMA) standard, and Wi-Fi standard activated transceivers and/or transmitters of a mobile device 106-1 . . . 106-N within a proximity of the network device 104 by detecting wireless signals transmitted from the mobile devices 106-1 . . . 106-N according to the wireless communication standard.

For example, mobile devices 106-1 . . . 106-N may utilize their active transceivers and/or transmitters to periodically broadcast respective wireless signals. These wireless signals may include frames of data and/or beacons (e.g., probe requests) transmitted as the mobile devices 106-1 . . . 106-N actively or passively scan for in-range computing networks. The wireless signals may contain data about the mobile devices 106-1 . . . 106-N. For example, the wireless signals may include information to identify the mobile devices 106-1 . . . 106-N. In an example, wireless signals may include and/or be utilized to determine a MAC address and/or a signal strength indicator of the mobile devices 106-1 . . . 106-N.

The mobile devices 106-1 . . . 106-N may utilize data frames of various types for data communication with a network device 104 and/or the computing network to which the network device 104 is communicatively coupled. The various frame types utilized by the mobile devices 106-1 . . . 106-N may be frames defined by corresponding standards such as IEEE 802.11 standard, IEEE 802.15 standards, IEEE 802.16 standards, etc. although examples of the disclosure are not limited to such standards.

In some examples, the mobile devices 106-1 . . . 106-N may utilize management frames in order to establish and/or maintain wireless communication with a network device 104, such as an access point, and/or the computing network to which the network device 104 is communicatively coupled. A network device 104 of a computing network may utilize management frames in order to establish and/or maintain wireless communication with mobile devices 106-1 . . . 106-N. A management frame may include a MAC address and/or a signal strength indicator.

As used herein, a management frame may include an authentication frame. An authentication may include process whereby a network device 104 accepts or rejects the identity of radio network interface cards (NICs) of the mobile devices 106-1 . . . 106-N. The NIC may begin the process by sending an authentication frame containing its identity to the network device 104. The management frame may also include a deauthentication frame sent to terminate secure communications.

The management frame may include an association request frame. A NIC of the mobile devices 106-1 . . . 106-N may begin an association process by sending an association request to the network device 104. This frame may carry information about the NIC (e.g., supported data rates) and the SSID of the network it wishes to associate with. After receiving the association request, the network device 104 may consider associating with the NIC, and (if accepted) reserves memory space and establishes an association ID for the NIC. The management frame may include a reassociation request frame if a radio NIC roams away from the currently associated network device 104 and finds another network device having a stronger beacon signal. The new network device then coordinates the forwarding of data frames that may still be in the buffer of the previous network device 104 waiting for transmission to the radio NIC. The management frame may include a disassociation frame when the mobile devices 106-1 . . . 106-N wishes to terminate an association. The NIC of the mobile devices 106-1 . . . 106-N may send the disassociation frame to alert the network device 104 that the NIC is powering off and the network device 104 may relinquish memory allocations and remove the radio NIC from the association table.

The management frame may include a probe request frame. A mobile device 106-1 . . . 106-N may send a probe request frame to obtain information from another mobile device 106-1 . . . 106-N and/or a network device 104. For example, the mobile device 106-1 . . . 106-N may send a probe request to determine which APs are within range of the mobile device 106-1 . . . 106-N. The probe request may occur periodically and without user instigation whenever the corresponding radio of the mobile device 106-1 . . . 106-N is active. For example, when a Wi-Fi setting of a computing device 106-1 . . . 106-N is activated, the Wi-Fi radio may periodically send, without human interaction, probe request frames looking for an AP of a Wi-Fi network to establish a connection with. The management frame may also include a probe response claim containing capability information, supported data rates, etc. sent in response to receiving a probe request frame.

As described above, the management frames communicated from a mobile device 106-1 . . . 106-N to a network device 104 may include information about the mobile device 106-1 . . . 106-N. The management frames may specify a MAC address of the mobile device 106-1 . . . 106-N, a signal strength indicator of the mobile device 106-1 . . . 106-N, an indication of the device type of the mobile device 106-1 . . . 106-N (e.g., smartphone device, laptop device, tablet device, wearable device, etc.).

While some of the examples described above are described with relation to a wireless process involving management frames communicated from a mobile device 106-1 . . . 106-N to a network device 104, other examples are contemplated that do not involve the specific management frames described above. For example, other communications or signals, either wired or wireless, may be detected by a network device 104, such as a scanner, even though the signals were not intended by the mobile device 106-1 . . . 106-N for detection by the network device 104. In some examples, the signals may be collected by monitoring traffic to a honeypot decoy computer system on a computing network. Regardless of the type of signal detected from the mobile device 106-1 . . . 106-N and/or the communication medium utilized to send that signal, the signal may include information about the mobile device 106-1 . . . 106-N, such as a MAC address of the mobile device 106-1 . . . 106-N, a signal strength indicator of the mobile device 106-1 . . . 106-N, an indication of the device type of the mobile device 106-1 . . . 106-N (e.g., smartphone device, laptop device, tablet device, wearable device, etc.).

In addition to including data that may be utilized to identify the source mobile device 106-1 . . . 106-N, the wireless signals received by the network device 104 may include data that may be utilized to detect and/or identify a physical location of the mobile device 106-1 . . . 106-N in the physical environment 102. Likewise, the wireless signals from the respective mobile devices 106-1 . . . 106-N may include data that may be utilized to track the positions and/or movements of the mobile devices 106-1 . . . 106-N within and through the physical environment 102 where the network device 104 is located.

For example, the signal strength indicators and/or changes in the signal strength indicators included in the wireless signals sent from the mobile devices 106-1 . . . 106-N and received at the network device 104 may be utilized to determine a relative position, a distance, a speed, a direction of movement, etc. of a mobile device 106-1 . . . 106-N in the physical environment 102. For example, a signal strength of a wireless signal received at a first network device 104 from a first mobile device 106-1 may increase as the first mobile device 106-1 draws nearer to the network device 104 in the physical environment 102 and/or may decrease as the first mobile device 106-1 moves away from the network device 104 in the physical environment 102. In another example, the signal strength of a wireless signal received from a first mobile device 106-1 may increase at a first network device on a West wall of the physical environment 102 and decrease at a second network device on an East wall of the physical environment 102 as the first mobile device 106-1 moves from East to West in the physical environment 102. Further, a network device 104 and/or a plurality of network devices may utilize a multilateration surveillance technique, a trilateration surveillance technique, and/or a triangulation surveillance technique to monitor the position of the mobile devices 106-1 . . . 106-N.

By monitoring the position of the mobile devices 106-1 . . . 106-N over a period of time the movements 108-1 . . . 108-N of the mobile devices 106-1 . . . 106-N may be tracked. That is, the movement 108-1 . . . 108-N of each of the mobile devices 106-1 . . . 106-N through the physical environment 102 may be tracked utilizing their respective wireless signals received at a network device 104. For example, a movement 108-1 of a first mobile device 106-1 through the physical environment 102 may be tracked based on a first wireless signal received at the network device 104 from the first mobile device 106-1; a movement 108-2 of a second mobile device 106-2 through the physical environment 102 may be tracked based on a second wireless signal received at the network device 104 from the second mobile device 106-2; and a movement 108-N of a third mobile device 106-3 through the physical environment 102 may be tracked based on a third wireless signal received at the network device 104 from the third mobile device 106-3.

The tracked movements 108-1 . . . 108-N of each of the mobile devices 106-1 . . . 106-N may be analyzed to identify correlations between the tracked movements 108-1 . . . 108-N. Identifying a correlation between tracked movements 108-1 . . . 108-N may include identifying a first tracked movement 108-1 and identifying a second tracked movement 108-2 that exhibit similar and/or identical directions of movement, similar and/or identical starting and ending positions, similar and/or identical durations of movement, similar and/or identical velocity of movement, similar and/or identical timing of movement, similar and/or identical patterns of movement, similar and/or identical acceleration of movement, similar and/or identical deceleration of movement, a proximity of movement paths, etc. That is, identifying a correlation between tracked movements 108-1 . . . 108-N may include identifying mobile devices, such as a first mobile device 106-1 and a second mobile device 106-2 in the illustrated example, that appear to move together based on similar and/or shared properties between their respective tracked movements 108-1 and 108-2. In the illustrated example, the first movement 108-1 may be correlated with the second movement 108-2 by virtue of both the movements 108-1 and 108-2 simultaneously occurring closely together and/or at a same or similar pace during the same time period South out of a central room of the physical environment 102, moving West in the hallway, and traversing down the hallway out a West exit of the physical environment 102 together. In the illustrated example, neither of the tracked movements 108-1 and 108-2 may be correlated with the tracked movement 108-N as the tracked movement 108-N may have a different starting point, occur at a different time, occur in a different location, and/or take a different route from the tracked movements 108-1 and 108-2.

In some examples, the first mobile device 106-1 may be associated with the movement 108-2 of the second mobile device 106-2 based on the correlation between the tracked movement 108-1 of the first mobile device 106-1 and the tracked movement 108-2 of the second mobile device 106-2. That is, the first mobile device 106-1 and/or the user of the first mobile device 106-1 may be assigned responsibility for having moved or been involved in the movement of the second mobile device 106-2. Since the association of the first mobile device 106-1 and the movement of the second mobile device 106-2 is based on the correlation between the tracked movement 108-1 of the first mobile device 106-1 and the tracked movement 108-2 of the second mobile device 106-2, the association may be made without knowledge of a previous identification of the first mobile device 106-1, a user profile associated with a first mobile device 106-1, a relationship between the first mobile device 106-1 and a second mobile device 106-2, etc. That is, a device may be associated with the movement of another device rather than relying on preestablished relationships or links between devices, manual input of users manually specifying relationships or links, and/or declared relationships or links between devices.

The third mobile device 106-3 may not be associated with the tracked movement 108-2 of the second mobile device 106-2 since the tracked movement 108-3 of the third mobile device 106-3 does not correlate to and/or match the tracked movement 108-2 of the second mobile device 106-2. Likewise, the fourth mobile device 106-N may not be associated with the tracked movement 108-2 of the second mobile device 106-2 since the fourth mobile device 106-N did not exhibit tracked movement during the monitoring period. The lack of an association between some of the mobile devices (e.g., 106-3 and 106-N) and the tracked movement 108-2 of the second mobile device 106-2 may be utilized to eliminate the unassociated mobile devices, their user profiles, their user's etc. from a list of suspects that may be responsible for the tracked movement 108-2 of the second mobile device 106-2.

An action may be assigned to be executed upon a next detection of the first mobile device 106-1 by the network device 104 based on the association between the first mobile device 106-1 and the movement of the second mobile device 106-2. A next detection may include a detection of the first mobile device 106-1 by a network device 104 of the computing network that occurs subsequent to the association of the first mobile device 106-1 to the tracked movement 108-2 of the second mobile device 106-2.

In some examples, a security apparatus may be implemented in the environment 100 and a security action may be assigned for execution upon a next detection of the first mobile device 106-1. A security action may include activation of an alert, an activation of an alarm, an activation and/or adjustment to a surveillance apparatus to draw attention to, monitor, and/or record the presence of the first mobile device 106-1 in the physical environment 102. As a result, the user of the first mobile device 106-1, who is suspected of being responsible for the tracked movement 108-2 of the second mobile device 106-2 on account of the association, may be stopped, apprehended, interrogated, identified, and/or subjected to additional security measures.

Such security actions may be utilized based on the second mobile device 106-2 being detected by the network device 104 as having exited a predefined zone, entered a predefined zone, and/or having left the physical environment 102 and/or no longer being detectable within the physical environment 102. For example, the above described operations may be utilized to determine that the second mobile device 106-2 has been stolen and/or it second wireless signal is otherwise absent from the physical environment 102. The detection of such a left may act as a trigger to assign the security action to the first mobile device 106-1 since the first mobile device 106-1 was associated with the tracked movement 108-2 of the second mobile device 106-2 immediately prior to its left and/or disappearance.

Figure 2:
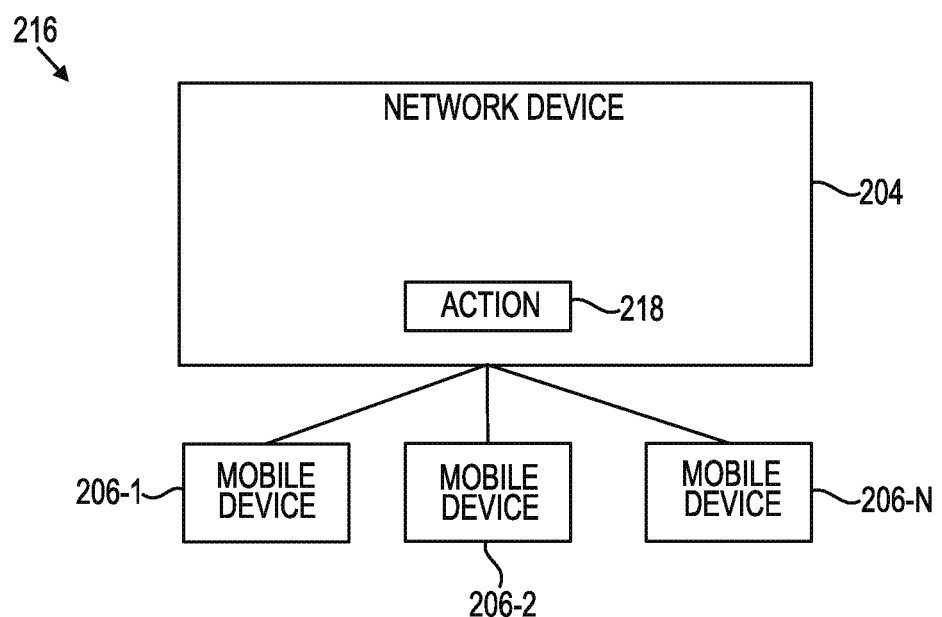
FIG. 2 illustrates an example of a system of device movement correlations consistent with the disclosure.

FIG. 2 illustrates an example of a system 216 of device movement correlations consistent with the disclosure. The system 216 is not limited to a particular example described herein and may include additional components and/or functionalities such as those described with regard to the environment 100 described in FIG. 1, the system 322 of FIG. 3, the non-transitory machine-readable medium 430 of FIG. 4, and/or the method 550 of FIG. 5.

The system 216 may include a network device 204. The network device 204 may include a device such as an AP that is advertising and/or providing access to a computing network. The network device may include a scanner including a transceiver to detect wireless signals emitted within a signal range in the physical environment where the network device 204 is located.

The network device 204 may be communicatively coupled to a computing device including a processing resource and a memory resource. The memory resource may store instructions executable by the processing resource to execute the below described functionalities associates with device movement correlations. For example, the computing device may be a separate device from the network device 204, such as a network controller or network security server. Alternatively, the computing device may be integrated with the network device 204. For example, the computing device may include the processing resource and memory resource utilized to execute the primary functionality of the network device 204 and/or to control hardware components such as the transceiver of the network device 204.

In some examples, the system 216 may include a plurality of mobile devices 206-1 . . . 206-N. The plurality of mobile devices 206-1 . . . 206-N may be mobile devices that are physically present in and/or moving within the physical environment where access to a computing network, such as a computing network that the network device 204 is communicatively coupled to, is being advertised and/or provided. The mobile devices 206-1 . . . 206-N may be mobile computing devices and/or beacon transmitters that are adapted to wirelessly communicate wireless signals. In some examples, the wireless signals transmitted by the mobile devices 206-1 . . . 206-N may include data adapted to establish and/or conduct data communication with a computing network.

The mobile device 206-1 . . . 206-N may transmit and/or receive wireless signals as they move through the physical environment. As such, these wireless signals may be received at network devices 204 communicatively coupled to a computing network. The received wireless signals may be utilized to track the individual movements of each of the mobile devices 206-1 . . . 206-N in the physical environment.

As such, the movement of a first mobile device 206-1 through the physical environment may be tracked based on a first wireless signal transmitted from the first mobile device 206-1 and received at the network device 204. Likewise, the movement of the second mobile device 206-2 through the physical environment may be tracked based on a second wireless signal transmitted by the second mobile device 206-2 and received by the network device 204. Further, the movement of a third mobile device 206-N through the physical environment may be tracked based on a third wireless signal transmitted by the third mobile device 206-N and received by the network device 204.

The tracked movements of the first mobile device 206-1, the second mobile device 206-2, and/or the third mobile device 206-N may be compared to each other to identify correlations between the respective movements. In some examples, each of the mobile devices 206-1 . . . 206-N that exhibit correlated movements may be associated together. For example, the first mobile device 206-1 may be associated with the movement of the second mobile device 206-2 based on a correlation between the tracked movement of the first mobile device 206-1 and the tracked movement of the second mobile device 206-2.

An action 218 may be assigned to be executed upon a next detection of the first mobile device 206-1 by the network device 204. The action 218 may be assigned based on the association of the first mobile device 206-1 to the movement of the second mobile device 206-2. The action 218 may include a security action.

For example, a first mobile device 206-1 may include a smartphone of a visitor to the physical environment where access to a computing network is being offered by the network device 104 present in the physical environment. For example, the first mobile device 206-1 may include a smartphone of a person that is not a resident of the physical environment such as an owner, an employee, a family member, or some other known entity who is authorized by and/or personally known to network administrators and/or owners of the computing network to which the network device 204 is communicatively connected. The first mobile device 106-1 may include a customer or visitor to a physical environment where access to the computing network is being provided by the network device 104, such as a storefront full of merchandise.

The second mobile device 206-2 may include a beacon transmitting tag. For example, the second mobile device 206-2 may include a BLE beacon tag that is attached to a physical object resident in the physical environment. A physical object resident in the physical environment may include a physical object that is supposed to be located and remain located within the physical environment and/or a specific zone thereof. For example, the second mobile device 206-2 may be a beacon emitting tracking tag that is affixed is a high-value asset that is resident to the physical environment where the network device 204 is offering access to the computing network. In the storefront example, the beacon emitting travel tag may be affixed to physical merchandise prior to its sale.

A correlation may be identified between the tracked movement of the first mobile device 206-1 and the tracked movement of the second mobile device 206-2. As such, the first mobile device 206-1 may be associated with the movement of the second mobile device 206-2. That is, the smartphone, the user profile associated with the smart phone, a MAC address of the smartphone, a human user of the smartphone, etc. may be associated with the movement of the physical object tagged with the second mobile device 206-2. For example, it may be inferred that the entity that caused the smartphone to move in a coordinated way with the movement of the second mobile device 206-2, is likely the entity that caused or was involved in the movement of the second mobile device 206-2.

In tracking the movement of the second mobile device 206-2, it may be determined that the second mobile device 206-2 and/or the asset that the second mobile device 206-2 is attached to is missing from the physical environment. For example, the second wireless signal transmitted from the second mobile device 206-2 may be tracked by the network device 204 as it moves from a position within the physical environment surrounding the network device 204, toward a periphery of the physical environment (e.g., an exit of a building, an edge of a virtually designated zone, an edge of a range of wireless signal detectability by the network device 204), and/or moves away from the network device 204 to an extent that the second wireless signal is no longer detectable by the network device 204.

As such, the tracked movement of the second mobile device 206-2 may be a movement associated with the theft or other inappropriate movement of the physical asset that the second mobile device 206-2 is affixed to. Therefore, it may be inferred that the entity that caused the smartphone to move in a coordinated way with the movement of the second mobile device 206-2, is an entity suspected to have stolen, to have inappropriately moved, or to have information regarding the theft or movement of the asset to which the second mobile device 206-2 is affixed.

In such examples, the action 218 assigned to be executed a next time that a first wireless signal from the smartphone is detected in the network and/or by the network device 204 may include generating a security alert. For example, when a first wireless signal is detected from the smartphone by the network device 204, subsequent to the association between the smartphone and the movement of the second mobile device 206-2 being established, an alert message may be sent to a security personnel, a network administrator, a security device, a security program, an employee, etc. The alert message may specify that a first wireless signal from the first mobile device 206-1 has been detected by the network device 204, a present determined location of the first mobile device 206-1 within the physical environment, identifying information about the first mobile device (e.g., brand or model of smart phone, MAC address of smartphone, etc.), a description or identity of a person suspected to be associated with the first mobile device 206-1. As such, the security alert may provide devices and/or personnel in the physical environment with characteristics and location information of the first mobile device 206-1 that may be utilized to apprehend and/or further identify the person responsible for the theft of an asset tagged with the second mobile device 206-2.

As described above, the first mobile device 206-1 does not have to be associated to an AP and/or authenticated to a computing network for its movements to be tracked and/or for an identification to be made. For example, an identification such as a MAC address of the smartphone may be recovered from management frames sent from and/or to the smartphone prior to any association of the smartphone to the computing network. As such, an attempt for a thief to stay anonymous to a computing network by not associating to the network device 204 may be in vain as the MAC address and/or other identifying information of the smartphone may be captured simply by the smartphone having an active transceiver without a full association or authentication. While such identifications may be somewhat less complete than identifications that may be obtained from a device that is associated to a network device 204, authenticated to the computing network, and/or transmitting data over the computing network, the identification may be sufficient to assign the security alert action 218 the next time the smartphone is in the physical environment surrounding the network device 204 and lead to the apprehension or identification of the thief.

In addition to assigning an action 218 based on the association, previous detections of the first mobile device 206-1 in the physical environment by the network device 204 may be identified. That is, historical logs of mobile devices detected by the network device 204 may be analyzed to determine whether a historical log exists for a mobile device corresponding to the identity determined for the first mobile device 206-1. Based on these historical logs, previous days, times, locations, movements, actions, etc. of the first mobile device 206-1 in the physical environment may be identified and/or utilized to help determine a more detailed identity or pattern of behavior associated with the first mobile device 206-1.

In some examples, the historical logs and/or the tracked movements of the first mobile device 206-1 may be utilized to correlate surveillance data captured from a location in the physical environment where the movement of the first mobile device was tracked to the first mobile device. For example, if the tracked movements of the first mobile device 206-1 reveal that the device traversed hallway one of an office building physical environment between 1:08 PM and 1:09 PM on Friday, June 3rd and surveillance camera A records footage from that hallway, then surveillance footage from surveillance camera A captured between 1:08 PM and 1:09 PM on Friday, June 3rd may be retrieved and correlated to the first mobile device 206-1. The surveillance footage may be utilized to identify the user of the first mobile device 206-1.

Additionally, correlations among the tracked movements of the plurality of mobile device 206-1 . . . 206-N detected in the physical environment may be utilized to generate additional associations between individual mobile devices. For example, as described above the movement of the third mobile device 206-N through the physical environment may be tracked based on a third wireless signal received at the network device 204 from the third mobile device 206-N. The tracked movement of the first mobile device 206-1 may be correlated to a tracked movement of the third mobile device 206-N. That is, some portion of the movement of the first mobile device 206-1 detected by the network device 204 may be correlated with some portion of the movement of the third mobile device 206-N detected by the network device 204. In some examples, the portion of the movement of the first mobile device 206-1 detected by the network device 204 that is correlated with the portion of the movement of the third mobile device 206-N detected by the network device 204 may be a separate or distinct portion of the movement of the first mobile device 206-1 than is correlated to the movement of the second mobile device 206-2 detected by the network device 204.

In such examples, the first mobile device 206-1 may be associated with the third mobile device 206-N based on the correlation between the tracked movement of the first mobile device 206-1 and the tracked movement of the third mobile device 206-N. For example, the first mobile device 206-1 may be associated with a user profile associated with the third mobile device 206-N.

Continuing the above examples where the first mobile device 206-1 is a smartphone device of a user visiting the physical environment and the second mobile device 206-2 is a beacon transmitting tag attached to an asset, a third mobile device 206-N may be a laptop computer utilizing a user profile authenticated to the computing network and associated with a specific employee. In such examples, the smartphone may be associated with the laptop on the basis of a correlation between a portion of the tracked movements of the smartphone and a portion of the tracked movements of the laptop within the physical environment. For example, based on the correlation between a portion of the tracked movements of the smartphone and a portion of the tracked movements of the laptop within the physical environment it may be determined that the user of the laptop and/or user profile utilized on the laptop owns the smartphone, is the person that moved the smartphone, and/or interacted with the person who moved the smartphone such that the user of the laptop may be able to identify the person.

Based on the aforementioned association between the first mobile device 206-1 and the third mobile device 206-N, an action may be assigned to be executed upon a next detection of any mobile device associated with the user profile. That is, any mobile device that is accessing the computing network utilizing a user profile may trigger an execution of an action. For example, where the user profile is associated with a specific employee, the user profile may be a profile used by a variety of mobile devices of the employee such as the employee's laptop, smartwatch, PDA, smartphone, tablet, etc. Once any of these devices is detected utilizing the user profile on the computing network the action may be triggered. The action may be a security action such as the security actions described above.

In some examples, when the first mobile device 206-1 is detected by the network device 204, a network policy specified in the user profile may be applied to it. For example, permissions, restrictions, credentials, and/or access controls specified in the user profile may be applied to the first mobile device 206-1.

Figure 3:
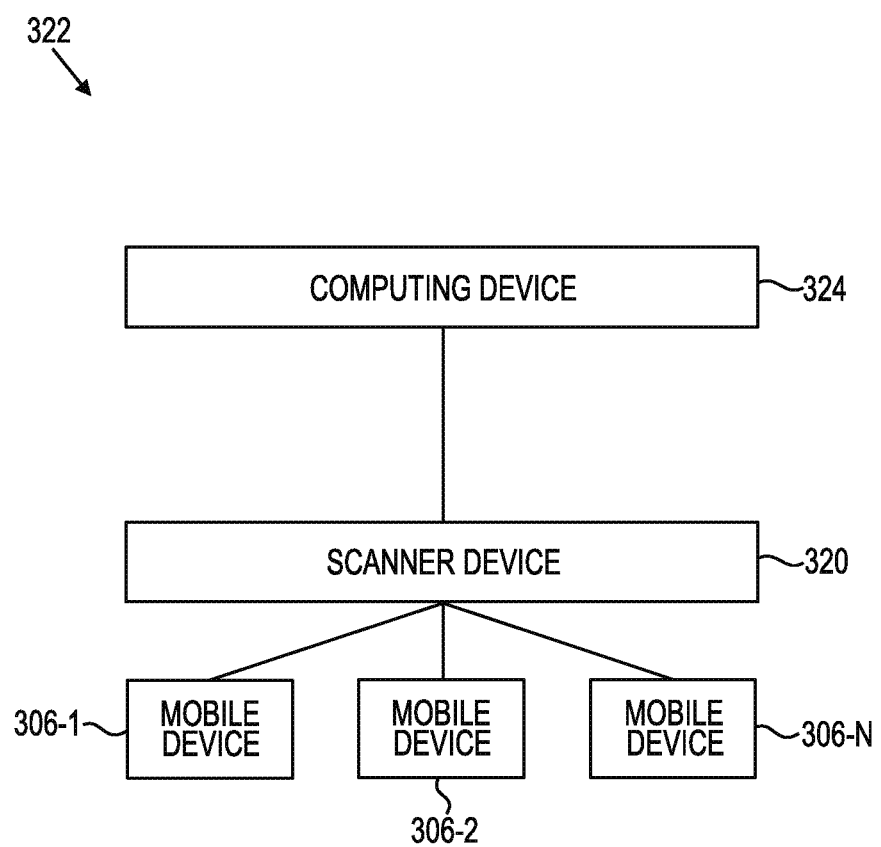
FIG. 3 illustrates an example of a system of device movement correlations consistent with the disclosure.

FIG. 3 illustrates an example of a system 322 of device movement correlations consistent with the disclosure. The system 322 is not limited to a particular example described herein and may include additional components and/or functionalities such as those described with regard to the environment 100 described in FIG. 1, the system 216 of FIG. 2, the non-transitory machine-readable medium 430 of FIG. 4, and/or the method 550 of FIG. 5.

The system 322 may include a computing device 324. The computing device 324 may include a processing resource and a memory resource. The memory resource may store instructions executable by the processing resource to execute the below described functionalities associates with device movement correlations.

The computing device 324 may be communicatively coupled to a computing network. For example, the computing device 324 may be a network controller or a network security server communicatively coupled to a computing network.

The system 322 may include a scanner device 320. The scanner device 320 may scan its surrounding physical environment and/or a computing network for signals from surrounding mobile devices. For example, the scanner device 320 may scan for and detect the presence of mobile devices in the physical environment where access to a computing network is provided. The scanner device 320 may include a specific-purpose computing device adapted as a standalone network appliance for scanning for wireless signals from mobile devices. Alternatively, a scanner device 320 may be integrated into or utilize functionalities of other network devices, such as an AP. A scanner device 320 may include a device that may utilize a transceiver and/or receiver to scan for, receive signals from, and/or send signals to mobile devices within a physical proximity to the scanner that have operating transceivers and/or transmitters capable of communicating with various scanned-for communication protocols (e.g., IEEE protocols, IEEE 802.15.4 ZigBee, IEEE 802.11 WiFi, IEEE 802.15.1 Bluetooth and BLE, IEEE 802.16 WiMax, LTE, 5G, NFC, RFID, etc.). A scanner device 320 may collect information from the surrounding mobile devices and/or may determine or provide data to be utilized to determine the physical location of the surrounding devices in the physical environment.

The wireless signals received at the scanner device 320 may be utilized to track movements of the mobile devices 306-1 . . . 306-N in the physical environment. For example, a first wireless signal received over a period of time from a first mobile device 306-1 at the scanner device 320 may be utilized to track the movement of the first mobile device 306-1 through the physical environment over the period of time. Likewise, a second wireless signal received over a period of time from a second mobile device 306-2 at the scanner device 306-2 over a period of time may be utilized to track the movement of the second mobile device 306-2 through the physical environment over the period of time. The movements of any and/or all of the mobile devices 306-1 . . . 306-N may be tracked utilizing their respective wireless signals received by the scanner device 320 over a period of time.

The tracked movements of each of the mobile devices 306-1 . . . 306-N may be compared. Portions of the tracked movement of each mobile device may be analyzed to determine if they correlate to a portion of the tracked movement of another of the mobile devices 306-1 . . . 306-N.

In an example, the first mobile device 306-1 may be associated with the movement of the second mobile device 306-2 based on a correlation between the tracked movement of the first mobile device 306-1 and the tracked movement of the second mobile device 306-2. The association may be utilized to assign and/or execute actions to be executed across a computing network. For example, an action may be assigned to be executed by a device communicatively coupled to a computing network. The action may be assigned to be executed upon a next detection of the first mobile device 306-1 by a scanner device 320. The action may be assigned based on the association of the first mobile device 306-1 with the movement of the second mobile device 306-2. For example, a security alert may be assigned to be disseminated to security devices across the computing network in response to detection of the first mobile device 306-1 by the scanner device 320 in response to an association of the first mobile device to a movement of the second mobile device 306-2 that resulted in a disappearance of the second wireless signal from the physical environment.

Figure 4:
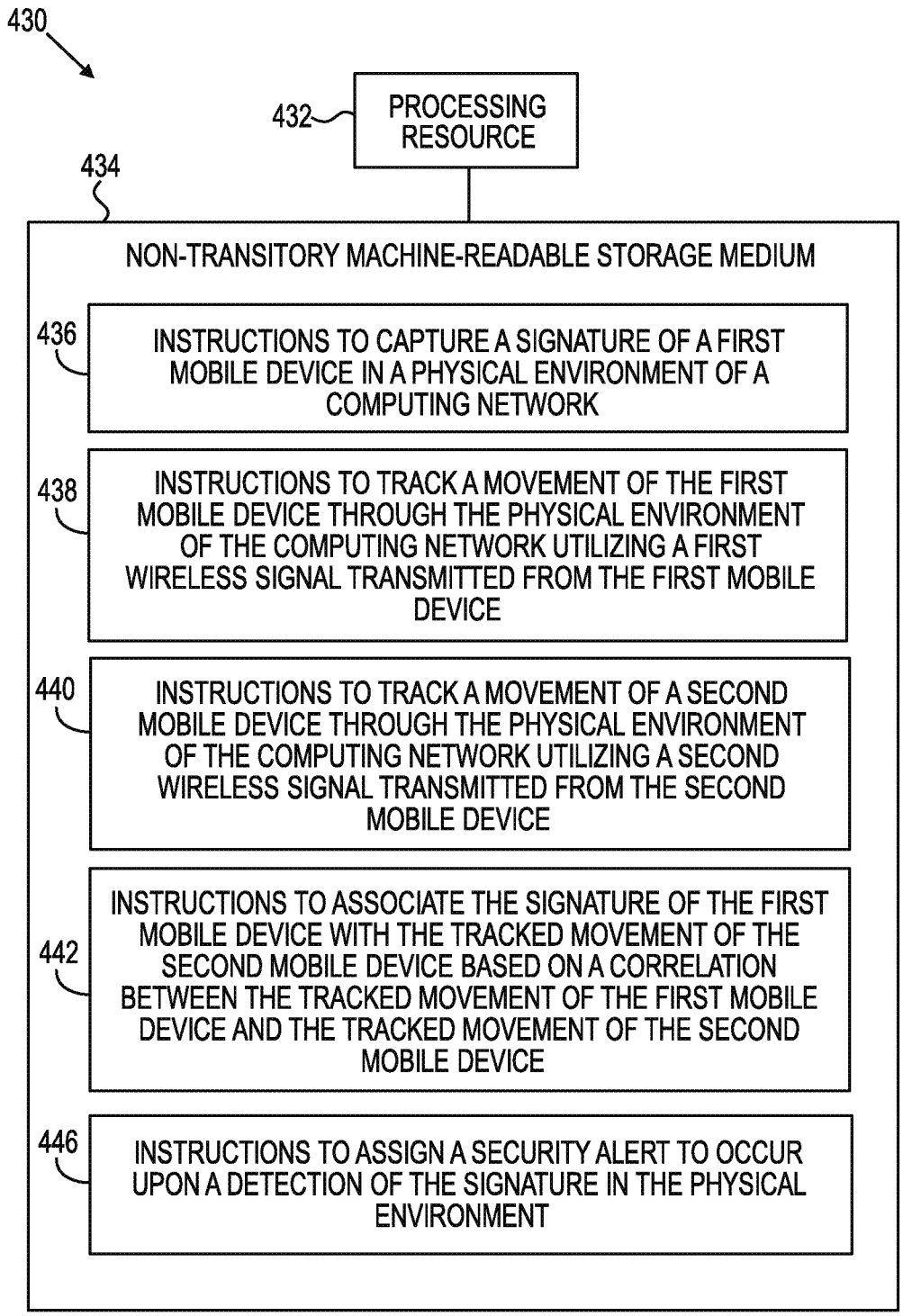
FIG. 4 illustrates a diagram of an example of a processing resource and a non-transitory machine-readable medium for device movement correlations consistent with the disclosure.

FIG. 4 illustrates a diagram 430 of a processing resource 432 and a non-transitory machine-readable medium 434 for device movement correlations consistent with the disclosure. A memory resource, such as the non-transitory machine-readable medium 434, may be used to store instructions (e.g., 436, 438, 440, 442, 446, etc.) executed by the processing resource 432 to perform the operations as described herein. The operations are not limited to a particular example described herein and may include additional operations such as those described with regard to the environment 100 described in FIG. 1, the system 216 of FIG. 2, the system 322 of FIG. 3, and the method 550 described in FIG. 5.

A processing resource 432 may execute the instructions stored on the non-transitory machine-readable medium 434. The non-transitory machine-readable medium 434 may be any type of volatile or non-volatile memory or storage, such as random-access memory (RAM), flash memory, read-only memory (ROM), storage volumes, a hard disk, or a combination thereof.

The machine-readable medium 434 may store instructions 436 executable by the processing resource 432 to capture a signature of a first mobile device detected in a physical environment where access to a computing network is being provided. A signature of a first mobile computing device may include an identity of the first mobile computing device and/or an identity of a user associated with the first mobile computing device.

The signature of the first mobile computing device may be detected from a wireless signal sent from the first mobile device. The signature of the first mobile device may be detected from a wireless signal sent prior to an association of the first mobile device to an AP and/or an authentication of the first mobile device to a computing network. For example, a signature of the first mobile device may be detected from a management frame detected by a scanner device and/or a network device without associating the first mobile computing device to the computing network and/or the network device.

In some examples, the signature of the first mobile device may include the MAC address of the first mobile device. In examples, the signature of the first mobile device may include a device make, a device model, a serial number, and/or other identifying data regarding the first mobile device. The signature of the first mobile device may include a user profile being utilized by the mobile device to access the computing network.

In some examples, the identity of a user of the first mobile device may be identified from the signature of the first mobile device. For example, the signature of the first mobile device may be looked up in a data structure where device signatures are correlated to identities of users. For example, the MAC address of the first mobile device may be looked up in a data structure revealing that the MAC address detected from the first mobile device is registered to a particular user named Joh Smith. In order to avoid being tricked by MAC spoofing, additional aspects of the signature of the first mobile device may be compared against corresponding data in the data structure. For example, the make and model of the first mobile device captured along with the MAC address may be referenced against the data structure to confirm that all aspects of the signature match the stored signature.

The machine-readable medium 434 may store instructions 438 executable by the processing resource 432 to track a movement of the first mobile device through the physical environment where the access to the computing network is being offered. The movement of the first mobile device may be tracked utilizing a first wireless signal transmitted from the first mobile device. The first mobile device may be tracked without associating the first mobile device to the computing network.

The machine-readable medium 434 may store instructions 440 executable by the processing resource 432 to track a movement of a second mobile device through the physical environment where access to the computing network is being offered. The second mobile device may be tracked utilizing a second wireless signal transmitted from the second mobile device.

In some examples, the second mobile device may be and/or may be attached to an asset to be monitored by the computing network and/or to stay in the physical environment where the access to the computing network is being offered. In some examples, the second mobile computing device and/or its movement may be tracked relative to designated zones in the physical environment. For example, a zone corresponding to a physical area may be virtually designated. The zone may be a zone that the second mobile device should not exit and/or should not enter.

The machine-readable medium 434 may store instructions 444 executable by the processing resource 432 to associate the signature of the first mobile device with the tracked movement of the second mobile device. The tracked movement of the first mobile device and the tracked movement of the second mobile device may be compared.

A correlation between a portion of the tracked movement of the first mobile device and a portion of the tracked movement of the second mobile device may be identified. The association of the signature of the first mobile device to the tracked movement of the second mobile device may occur based on the correlation between the tracked movement of the first mobile device and the tracked movement of the second mobile device.

The machine-readable medium 434 may store instructions 446 executable by the processing resource 432 to assign a security alert to occur upon a detection of the signature in the physical environment. The security alert may include a warning that the second mobile device is missing or outside of a zone, an identification of second mobile device, an identification of a first mobile device whence the signature associated with the tracked movement of the second mobile device came, an identification of a user of the first mobile device, and/or other data collected by security apparatuses regarding the identity of the user of the first mobile device.

The security alert may be assigned responsive to an interruption in detecting the second wireless signal in the physical environment. For example, when detection of the second wireless signal is interrupted it may be assumed that the second mobile device and/or the physical object that the second mobile device is attached to has been removed from the physical environment. The removal may correspond to a theft and/or an erroneous misplacement of the second mobile device and/or the asset that it tags.

As described above, the movement and/or location of the second mobile device may be monitored and/or tracked relative to a designated zone of the physical environment. In some examples, the security alert may be assigned responsive to a determination that the tracked movement of the second mobile device resulted in the location of the second mobile device moving outside of the designated zone of the physical environment. For example, the second mobile device may be a critical computing asset stored in a secure area of a facility. If the second mobile device is tracked moving outside of that secure area of the facility, the security alert may be triggered.

Figure 5:
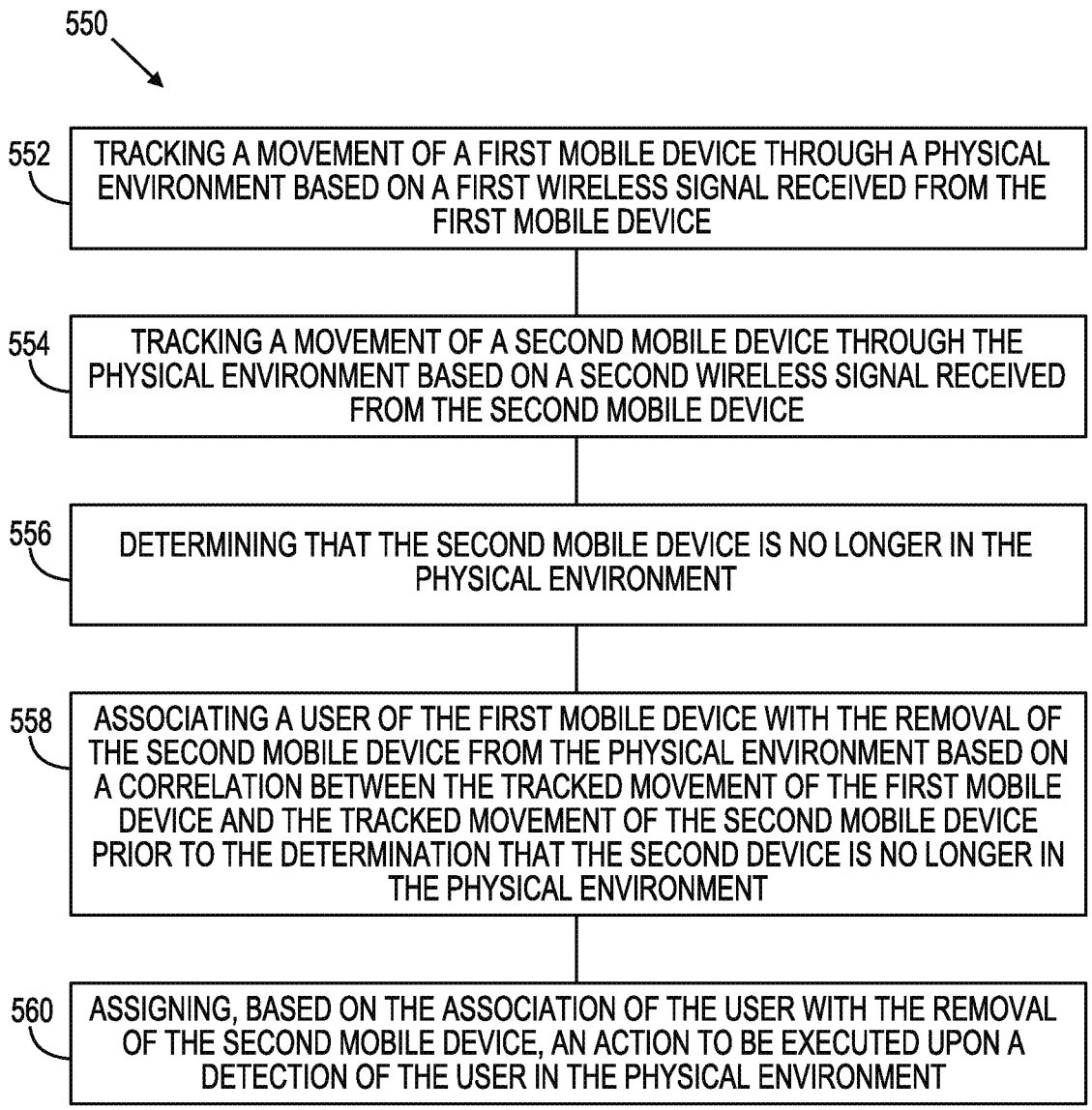
FIG. 5 illustrates a diagram of an example of a method for device movement correlations consistent with the disclosure.

FIG. 5 illustrates a diagram of a method 550 for device movement correlations consistent with the disclosure. The method 550 is not limited to a particular example described herein and may include additional components and/or functionalities such as those described with regard to the environment 100 described in FIG. 1, the system 216 of FIG. 2, the system 322 of FIG. 3, and the non-transitory machine-readable medium 430 of FIG. 4.

At 552, the method 550 may include tracking a movement of a first mobile device through a physical environment. The movement of the first mobile device through the physical environment may be tracked based on a first wireless signal received from the first mobile device. For example, wireless data frames may be periodically transmitted by the first mobile device over a period of time and may be detected by network devices over the period of time.

The location of the first mobile device when it transmitted each of those data frames may be determined based on data included in the frames and/or data collected across a plurality of network devices. For example, the location of the first mobile device when it transmitted each of those data frames may be determined utilizing a signal strength surveying technique applied to the first wireless signal. The location of the first mobile device when it transmitted each of those data frames may be determined utilizing a multilateration survey technique applied to the first wireless signal. The location of the first mobile device when it transmitted each of those data frames may be determined utilizing a trilateration surveillance technique applied to the first wireless signal. The location of the first mobile device when it transmitted each of those data frames may be determined utilizing a triangulation surveillance technique as applied to the first wireless signal. Utilizing signal surveillance techniques, the position of the first mobile device may be repeatedly determined over a period of time. The position over the period of time may be plotted on to a map of a physical environment to reveal the tracked movement of the first mobile device.

At 554, the method 550 may include tracking a movement of a second mobile device through a physical environment. The movement of the second mobile device through the physical environment may be tracked based on a second wireless signal received from the second mobile device. For example, wireless data frames may be periodically transmitted by the second mobile device over a period of time and may be detected by network devices over the period of time.

The location of the second mobile device when it transmitted each of those data frames may be determined based on data included in the frames and/or data collected across a plurality of network devices. For example, the location of the second mobile device when it transmitted each of those data frames may be determined utilizing a signal strength surveying technique applied to the second wireless signal. The location of the second mobile device when it transmitted each of those data frames may be determined utilizing a multilateration survey technique applied to the second wireless signal. The location of the second mobile device when it transmitted each of those data frames may be determined utilizing a trilateration surveillance technique applied to the second wireless signal. The location of the second mobile device when it transmitted each of those data frames may be determined utilizing a triangulation surveillance technique as applied to the second wireless signal. Utilizing signal surveillance techniques, the position of the second mobile device may be repeatedly determined over a period of time. The position over the period of time may be plotted on to a map of a physical environment to reveal the tracked movement of the second mobile device.

At 556, the method 550 may include determining that the second mobile device is no longer in the physical environment. Detecting that the second mobile device is no longer in the physical environment may include detecting that a second wireless signal transmitted by the second mobile device is no longer being detected within the physical environment. Additionally, detecting that the second mobile device is no longer in the physical environment may include determining, based on the tracked movements of the second mobile device, that the mobile device was moved in a manner consistent with exiting the confines of a physical environment.

At 558, the method 550 may include associating a user of the first mobile device with the removal of the second mobile device from the physical environment. The association may be based on a correlation between the tracked movement of the first mobile device and the tracked movement of the second mobile device immediately prior to the determination that the second device is no longer in the physical environment. That is, the association may be based on the correlated movements of the first mobile device and the second mobile device being consistent with the first mobile device moving along with the second mobile device during or immediately preceding the removal of the second mobile device from the environment.

At 560, the method 550 may include assigning, based on the association of the user with the removal of the second mobile device, an action to be executed upon a detection of the user in the physical environment. The action may be a security action. For example, the action may be an action to assist in identifying, apprehending, tracking, and/or locating the user of the first mobile device.

The user may be detected in the physical environment based on a detection of the first mobile device. That is, a user's presence and/or location in a physical environment may be detected based on first signals received from the first mobile device being detected by network devices in the physical environment.

Additionally, a third mobile device associated with the user may be determined. The identification of the third mobile device may be made based on a correlation between the tracked movements of the first mobile device to tracked movements of the third mobile device. For example, the third mobile device may have been tracked moving along with the first mobile device prior to the first mobile device being tracked moving along with the second mobile device on its way out of the physical environment. In other examples, the third mobile device may have been tracked moving along with the first mobile device and the second mobile device. In such examples where a third device is associated with the first mobile device and/or the user of the first mobile device, the user may be detected in the physical environment based on a subsequent detection of the third mobile device in the physical environment with or without the detection of the first mobile device as well.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A system, comprising:
   a computing device, communicatively coupled to a network device, including:
   a processing resource; and
   a memory resource storing instructions executable by the processing resource to:
   capture a signature of a first mobile device in a physical environment of a computing network;
   track a movement of the first mobile device through the physical environment of the computing network utilizing a first wireless signal transmitted from the first mobile device;
   track a movement of a second mobile device through the physical environment of the computing network utilizing a second wireless signal transmitted from the second mobile device;
   associate the signature of the first mobile device with the tracked movement of the second mobile device based on a correlation between the tracked movement of the first mobile device and the tracked movement of the second mobile device; and
   assign a security alert to be executed upon a next detection of the signature in the physical environment.

2. The system of claim 1, wherein the first mobile device is a smartphone of a visitor to the physical environment and the second mobile device is a beacon attached to an asset resident to the physical environment.

3. The system of claim 2, including instructions to determine that the asset is missing based on the tracked movement of the second mobile device and the second wireless signal transmitted by the second mobile device no longer being detected by the network device.

4. The system of claim 3, wherein the assigned action includes generating a security alert identifying a location of the first mobile device in the physical environment.

5. The system of claim 1, including instructions to identify previous detections of the first mobile device in the physical environment by the network device.

6. The system of claim 1, including instructions to correlate surveillance data captured from a location in the physical environment where the movement of the first mobile device was tracked to the first mobile device.

7. The system of claim 1, including instructions to:
   track a movement of a third mobile device through the physical environment based on a third wireless signal received, at the network device, from the third mobile device; and
   associate the first mobile device with a user profile associated with the third mobile device based on a correlation between the tracked movement of the first mobile device and the tracked movement of the third mobile device.

8. The system of claim 7, including instructions to assign, based on the association between the first mobile device and the user profile of the third mobile device, a second action to be executed upon a next detection, by the network device, of any mobile device associated with the user profile.

9. The system of claim 7, including instructions to apply a network policy specified in the user profile to the first mobile device.

10. A non-transitory machine-readable medium storing instructions executable by a processing resource to:
    capture a signature of a first mobile device in a physical environment of a computing network;
    track a movement of the first mobile device through the physical environment of the computing network utilizing a first wireless signal transmitted from the first mobile device;
    track a movement of a second mobile device through the physical environment of the computing network utilizing a second wireless signal transmitted from the second mobile device; and
    associate the signature of the first mobile device with the tracked movement of the second mobile device based on a correlation between the tracked movement of the first mobile device and the tracked movement of the second mobile device; and
    assign a security alert to occur upon a detection of the signature in the physical environment.

11. The non-transitory machine-readable medium of claim 10, wherein the security alert is assigned responsive to an interruption in detecting the second wireless signal in the physical environment.

12. The non-transitory machine-readable medium of claim 10, including instructions to monitor a location of the second mobile device relative to a designated zone of the physical environment.

13. The non-transitory machine-readable medium of claim 11, wherein the security alert is assigned responsive to a determination that the tracked movement of the second mobile device resulted in the location of the second mobile device moving outside of the designated zone of the physical environment.

14. The non-transitory machine-readable medium of claim 10, wherein the signature of the first mobile device is a media Access Control (MAC) address of the first mobile device.

15. The non-transitory machine-readable medium of claim 10, wherein the signature of the first mobile device is captured from a management frame without associating the first mobile device to the computing network.

16. The non-transitory machine-readable medium of claim 10, including instructions to identify a user of the first mobile device based on the signature of the first mobile device.

* * * * *